(12) United States Patent  (10) Patent No.: US 9,020,466 B2
Blinnikka et al.  (45) Date of Patent: Apr. 28, 2015

(54) REMOTE PROFILE MODIFICATION FOR DEVICE RECOVERY ASSIST

(75) Inventors: Tomi Blinnikka, Berkeley, CA (US); Jeffrey Bennett, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1614 days.

(21) Appl. No.: 11/835,937

(22) Filed: Aug. 8, 2007

(65) Prior Publication Data

US 2009/0042598 A1    Feb. 12, 2009

(51) Int. Cl.

| H04M 1/66 | (2006.01) |
|---|---|
| H04M 3/42 | (2006.01) |
| H04M 3/00 | (2006.01) |
| G06F 15/16 | (2006.01) |
| G06F 15/177 | (2006.01) |
| G06F 15/173 | (2006.01) |
| H04W 8/24 | (2009.01) |
| H04L 29/08 | (2006.01) |
| H04M 1/725 | (2006.01) |

(52) U.S. Cl.
CPC ............ H04M 1/66 (2013.01); H04M 1/72525 (2013.01); H04W 8/245 (2013.01); H04L 67/306 (2013.01); H04L 67/14 (2013.01)

(58) Field of Classification Search
CPC ..... H04W 12/12; H04W 12/06; H04W 88/02; G06F 21/88; G06F 21/572
USPC ............... 455/435.1, 410–411, 414.1, 414, 455/418–420; 709/217–221, 224
See application file for complete search history.

(56) References Cited

U.S. PATENT DOCUMENTS

| 2004/0063423 A1* | 4/2004 | Kagay, Jr. ................. 455/410 |
|---|---|---|
| 2004/0103298 A1* | 5/2004 | Hafeman .................... 713/200 |
| 2004/0137893 A1* | 7/2004 | Muthuswamy et al. ...... 455/419 |
| 2006/0109101 A1* | 5/2006 | Genda et al. ................ 340/521 |
| 2006/0161628 A1* | 7/2006 | Nagy et al. .................. 709/206 |
| 2008/0079581 A1* | 4/2008 | Price ......................... 340/572.1 |
| 2009/0014998 A1* | 1/2009 | Tyrrell ........................ 283/70 |

* cited by examiner

Primary Examiner — Dung Hong
(74) Attorney, Agent, or Firm — James J. DeCarlo; Greenberg Traurig, LLP

(57) ABSTRACT

A system is provided for recovering a mobile device by enabling an authorized user to remotely change the profile of the device to assist others in returning the device to the user. Initially, a user registers the mobile device with a recovery assist server. When the user is unable to locate the device because it is, for example, lost or stolen, the user indicates with the server that the device is missing. The device and the server are configured to communicate with each other, for example, periodically or, in another example, on device start up. If the device is identified as missing on the server, the operation of the mobile device is configured based on a missing profile associated with the mobile device. Once the device is located, the user indicates with the server that the device is no longer missing. When the device is unidentified as missing on the server, the operation of the mobile device is configured based on a user profile associated with the mobile device. When the mobile device is configured based on the missing profile, the mobile device may, for example, display a background image or play a ring tone to inform persons near the device that the device is considered mislaid and to provide such persons with information for returning the device.

15 Claims, 8 Drawing Sheets

REMOTE PROFILE MODIFICATION FOR DEVICE RECOVERY ASSIST

FIELD OF THE INVENTION

The present invention relates generally to a system for assisting a person in returning a mobile device which is mislaid and, in particular but not exclusively, to changing the profile of the mobile device remotely to assist a person in returning the device.

BACKGROUND OF THE INVENTION

When someone discovers an unattended mobile device, that person may be confused as to the status of the device. For example, the mobile device may be lost, or alternatively, the owner of the device may be nearby and will return shortly after having left the device temporarily unattended. Accordingly, it may be unclear whether the device is considered lost by its owner. Furthermore, if the person wishes to return the device to its owner, the person must proactively attempt to gather information about the owner to determine how and where to return the device. In some circumstances, information about the owner may not be readily available from the device, for example, because access to the device is protected by a password.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description Of The Embodiments, which is to be read in association with the accompanying drawings, wherein.

DETAILED DESCRIPTION OF THE EMBODIMENTS

Figure 1:
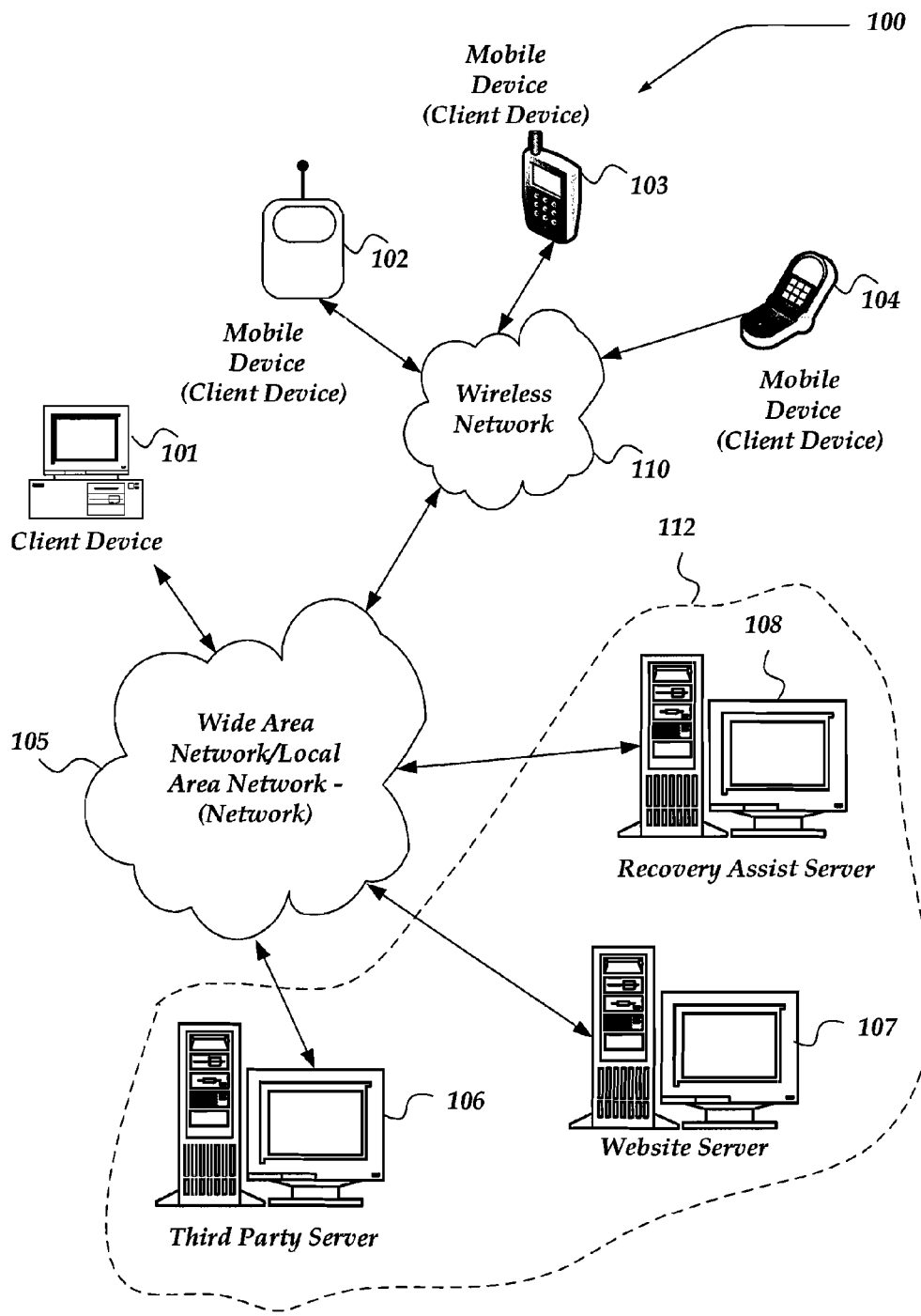
FIG. 1 illustrates a diagram of one embodiment of an exemplary system in which the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "receiving" an item, such as a request, response, or other message, from a device or component includes receiving the message indirectly, such as when forwarded by one or more other devices or components. Similarly, "sending" an item to a device or component includes sending the item indirectly, such as when forwarded by one or more other devices or components.

As used herein, the term "mobile client application" refers to an application that runs on a mobile device. A mobile client application may be written in one or more of a variety of languages, such as C, C++, J2ME, Brew, Java, and the like. Browsers, email clients, text messaging clients, calendars, and games are examples of mobile client applications.

Briefly stated, the present invention is directed toward a system for recovering a mobile device by enabling an authorized user to remotely change the profile of the device to assist others in returning the device to the user. Initially, a user registers the mobile device with a recovery assist server. When the user is unable to locate the device because it is, for example, lost or stolen, the user indicates with the server that the device is missing. The device and the server are configured to communicate with each other, for example, periodically or, in another example, on device start up. If the device is identified as missing on the server, the operation of the mobile device is configured based on a missing profile associated with the mobile device. Once the device is located, the user indicates with the server that the device is no longer missing. When the device is unidentified as missing on the server, the operation of the mobile device is configured based on a user profile associated with the mobile device. When the mobile device is configured based on the missing profile, the mobile device may, for example, display a background image or play a ring tone to inform persons near the device that the device is considered mislaid and to provide such persons with information for returning the device.

A profile of a mobile device specifies a configuration for customizing the operation of the mobile device. In at least one or more embodiments, a profile includes a collection of one or more settings for configuring the operation of the mobile device. In at least one or more embodiments, a profile includes one or more files such as, for example, an image file, an audio file, a data file, an executable file, a script file, and the like for configuring the operation of a mobile device. In at least one or more embodiments, one or more profiles can be stored on the mobile device and utilized to configure the mobile device. In at least one or more embodiments, one or more profiles can be stored on a server and a profile can be downloaded from the server onto the mobile device to configure the mobile device.

In at least one or more embodiments, one or more profiles are associated with a mobile device including a user profile and a missing profile. A user profile specifies a configuration for the operation of the mobile device preferred by a user. A user profile can specify a default configuration or a factory configuration specified by the manufacturer of the mobile device, a configuration customized by the user, and the like. A missing profile specifies a configuration for the operation of the mobile device that is suitable for aiding others in returning the mobile device to the user.

In at least one or more embodiments, a missing profile specifies a configuration of a mobile device which displays an image on a display of the device to assist others in returning the device to the user. An image can be a background image, a screen saver, a startup image, and the like. Also, in at least one or more embodiments, the image includes a notice that the mobile device is mislaid. Further, in at least one or more embodiments, the image includes return information such as, for example, a street address, a telephone number, an email address, a name of a contact, and the like for returning the device. Additionally, return information can be associated with an authorized user, an entity associated with the server, a police station, a post office, a post box, and other persons/entities/things which can be helpful in returning the device to the user.

In at least one or more embodiments, an image, which is displayed when a mobile device is configured based on a missing profile, can include return information in the form of geographic information such as a map, directions to a location, and the like to assist others in returning the device to the user. When the mobile device is capable of determining its proximate location through, for example, the use of a location service such as a Global Position System (GPS), the geographic information can be based on the proximate location of the mobile device. For example, a map can be displayed indicating one or more of the closest police stations near the proximate location of the mobile device.

In at least one or more embodiments, a missing profile specifies a configuration of a mobile device which plays an audio on a speaker of the device to assist others in returning the device to the user. An audio can be a ring tone, a startup sound, a background music, and the like. For example, a missing profile can configure a mobile device having phone capabilities to play a ring tone at maximum volume which announces that the device is lost or stolen and provides return information whenever a call is received on the mobile device. In another example, the missing profile can configure a mobile device to play an audio requesting assistance in returning the device periodically, at startup, continuously, and/or when someone attempts to access and/or utilize one or more capabilities of the device.

In at least one or more embodiments, a missing profile specifies a configuration of a mobile device which limits or locks the use of one or more capabilities of the mobile device. Also, in at least one or more embodiments, limiting or locking the device can involve preventing access, disabling, and/or restricting the use of some or all of the features of a capability of the mobile device. For example, a missing profile can configure a mobile device to require a password to access or utilize one or more of its capabilities. In another example, a missing profile can configure a mobile device with voice communication capabilities to limit the use of the voice communication capabilities for contacting one or more members of a select group, which can include, for example, an authorized user, an entity associated with the server, an emergency service, or the like. An emergency service can include, for example, a 9-1-1 emergency response service, a police department, a fire department, an ambulance service, and the like.

In at least one or more embodiments, a missing profile specifies a configuration of a mobile device which reduces the amount of power consumed by the mobile device when it is operating on batteries. By reducing power consumption, the duration in which the device can assist others in returning the device is extended. For example, a missing profile can configure a mobile device to dim its display or otherwise configure its components to operate in a manner that consumes less power. Also, in at least one or more embodiments, the mobile device can turn off or disable one or more components to consume less power. For example, in a mobile device which can selectively disable its GPS, WLAN, GSM, or DVD modules, a missing profile con configure the mobile device to disable one or more of such modules to reduce power consumption.

In at least one or more embodiments, an interface is provided to enable a user to register the mobile device with the server. For example, an online web interface associated with the server is provided to enable the user to register the mobile device from a browser on the mobile device and/or from a browser on a separate device. In another example, the mobile device can be registered by speaking with a customer representative of an entity that is associated with the server. Also, in at least one or more embodiments, an application is made available for downloading onto the mobile device to enable the mobile device to communicate and/or register with the server.

In at least one or more embodiments, a confirmation request is sent to the mobile device from the server to request confirmation from the user that the device is to be registered. Also, in at least one or more embodiments, a confirmation is provided to the server from the device at the direction of the user to complete the registration. For example, the server may send a Short Message Service (SMS) message to the mobile device to request confirmation that the device is to be registered. In another example, the user can send a SMS message from the mobile device to the server to confirm and complete the registration.

In at least one or more embodiments, an interface is provided to enable the user to indicate to the server that the registered mobile device is missing. For example, an online web interface associated with the server is provided to enable the user to identify with the server that the registered mobile device is missing. In another example, the user can communicate with a customer representative of an entity associated with the server to identify the registered mobile device as missing. Also, in at least one or more embodiments, an interface is provided to enable the user to specify a missing profile for the registered mobile device. Further, in at least one or more embodiments, an interface is provided to enable the user to specify the return information that is provided on the mobile device when the operation of the mobile device is configured based on the missing profile. Additionally, in at least one or more embodiments, an interface is provided to enable the user to indicate to the server that the registered mobile device is no longer missing.

In at least one or more embodiments, a registered mobile device is configured to communicate with the server so that the operation of the mobile device can be configured if the device is identified or unidentified as missing. Also, in at least one or more embodiments, the registered mobile device is configured to communicate with the server on device startup, periodically, when the power state of the mobile device changes such as, for example, when the device starts or stops being recharged, and/or when someone attempts to access and/or utilize one or more capabilities of the device. Further, in at least one or more embodiments, the registered mobile device is configured to communicate with the server when the device gains access to a new network or regains access to a network in which access was lost. Additionally, in at least one or more embodiments, the server is configured to communicate with the device when the device is identified or unidentified as missing, periodically and/or at the direction of the user.

In at least one or more embodiments, a registered mobile device and/or server saves the current user profile of the mobile device if the registered mobile device is identified as missing on the server. Also, in at least one or more embodiments, the registered mobile device restores the configuration of the mobile device to the saved user profile if the registered mobile device is unidentified as missing.

In at least one or more embodiments, when the operation of the mobile device is configured based on the missing profile, the mobile device provides return information associated with an intermediary. An intermediary is someone other than the user and can include, for example, an entity associated with the server. Also, in at least one or more embodiments, the intermediary upon receiving the device provides the device to the user. For example, rather than providing personal information about the user, return information for an intermediary is provided instead. Once the intermediary receives the mislaid mobile device, the intermediary forwards the mobile device to the user. Accordingly, personal information about the user is kept private and not provided to those who assist in returning the device.

In at least one or more embodiments, an online platform for enabling the invention can be arranged to operate as a system in one or more local or remote environments, including peer to peer, client-server, stand alone application, web based service, and/or the like. Also, the online platform can be accessed by users, customers, and third parties, with one or more different types of computing devices, including, but not limited to, personal computers, video game consoles, mobile telephones, smart watches, pagers, and/or personal digital assistants (PDA).

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, third party server 106, website server 107, recovery assist server 108, mobile (wireless) devices 102-104, and client device 101.

One embodiment of mobile devices 102-104 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome display on which only text may be displayed. In another example, a web-enabled mobile device may have a touch sensitive screen, a stylus, and several lines of a color display in which both text and graphics may be displayed.

Figure 3:
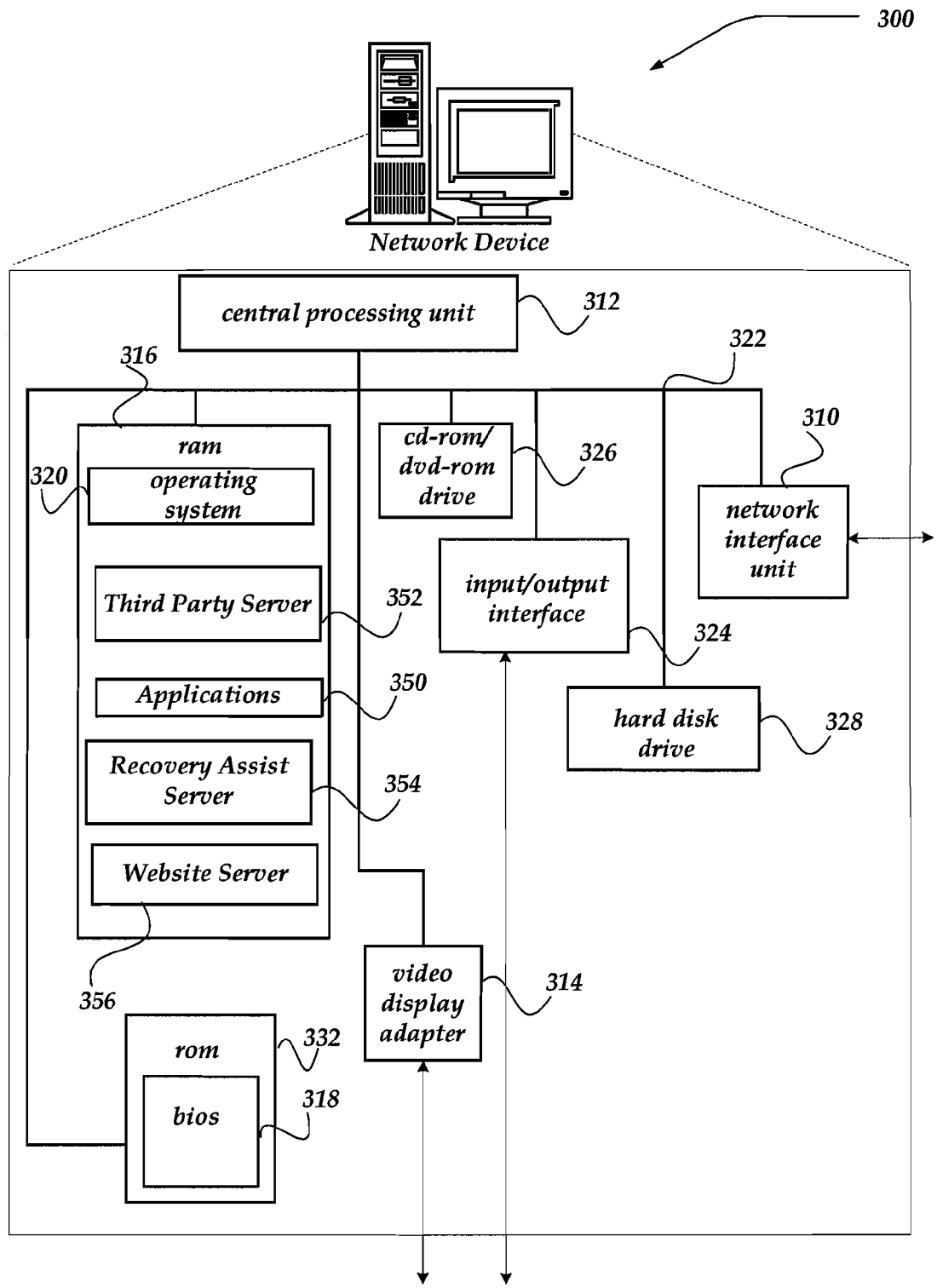
FIG. 3 illustrates a schematic diagram of one embodiment of an exemplary network device.

Client device 101 may include virtually any computing device capable of communicating over a network to send and receive information, such as network device 300 shown in FIG. 3, or the like. The set of such client devices may include devices that typically connect using a wired or wireless communications medium such as personal computers, multiprocessor systems, microprocessor-based or programmable consumer electronics, network PCs, or the like.

Mobile devices 102-104 as well as client device 101 may further be configured to include a client application that enables an end-user to log into a membership account on platform 112 that includes servers 106, 107, and 108. Such an end-user membership account, for example, may be configured to enable one or more activities, including: enabling the member to send/receive messages with other members, non-members, and the platform administrator(s); access content on selected web pages; access chat rooms; access blogs; access reviews of products and services by industry experts and/or other members; purchase products and/or services; and try out available demonstrations for products/services prior to purchase. However, participation in at least some of these activities may also be performed without logging into the end-user membership account. Additionally, mobile devices 102-104 may also communicate with non-mobile (wired) client devices, such as client device 101, or the like.

Wireless network 110 is configured to couple mobile devices 102-104 and its components with communication provided over network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further employ a plurality of access technologies including 2nd (2G), 3rd (3G), and 4th (4G) generation radio access for cellular systems, WLAN, WiMax, Wireless Router (WR) mesh, and the like. Access technologies such as 2G, 3G, 3G, and future wireless access networks may enable wide area coverage for mobile devices, such as mobile devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Universal Mobile Telephone System (UMTS), and the like. In essence, wireless network 110 may include virtually any wireless communication mechanism by which information may travel between mobile devices 102-104 and another computing device, network, and the like.

Network 105 is configured to couple platform 112 and its servers with other computing devices, including, mobile devices 102-104, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between platform 112, client device 101, and other computing devices.

Additionally, communication media typically embodies processor-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Platform 112 can also include a variety of services used to provide services to remotely located members. Such services include, but are not limited to web services, third-party services, audio services, video services, email services, Instant Messaging (IM) services, Short Message Service (SMS) services, Multimedia Messaging Service (MMS) services, Voice Over Internet Protocol (VOIP) services, video game services, blogs, chat rooms, gaming services, calendaring services, shopping services, photo services, or the like. Although FIG. 1 illustrates platform 112 including servers 106, 107, and 108 as physically separate computing devices, the invention is not so limited. For example, one or all of the servers can be operated on one computing device, without departing from the scope or spirit of the present invention. Also, devices that may operate as platform 112 include personal computers desktop computers, multiprocessor systems, microprocessor-based or programmable consumer electronics, network PCs, servers, and the like.

Recovery assist server 108 represents an embodiment of a recovery assist server of the present invention. Website server 107 and/or third party server 106 can act in conjunction with recovery assist server 108 to enable a user to register a mobile device, indicate that the mobile device is missing or no longer missing, specify one or more profiles of the mobile device, as well as perform other functions in accordance with the present invention. Third party server 106 represents a server that is associated with an entity separate from the entity associated with the recovery assist server 108. For example, third party server 106 can be a server operated by a phone company providing an interface for its clients to access recovery assist server 108, which is operated by a another entity.

Illustrative Mobile Device

Figure 2:
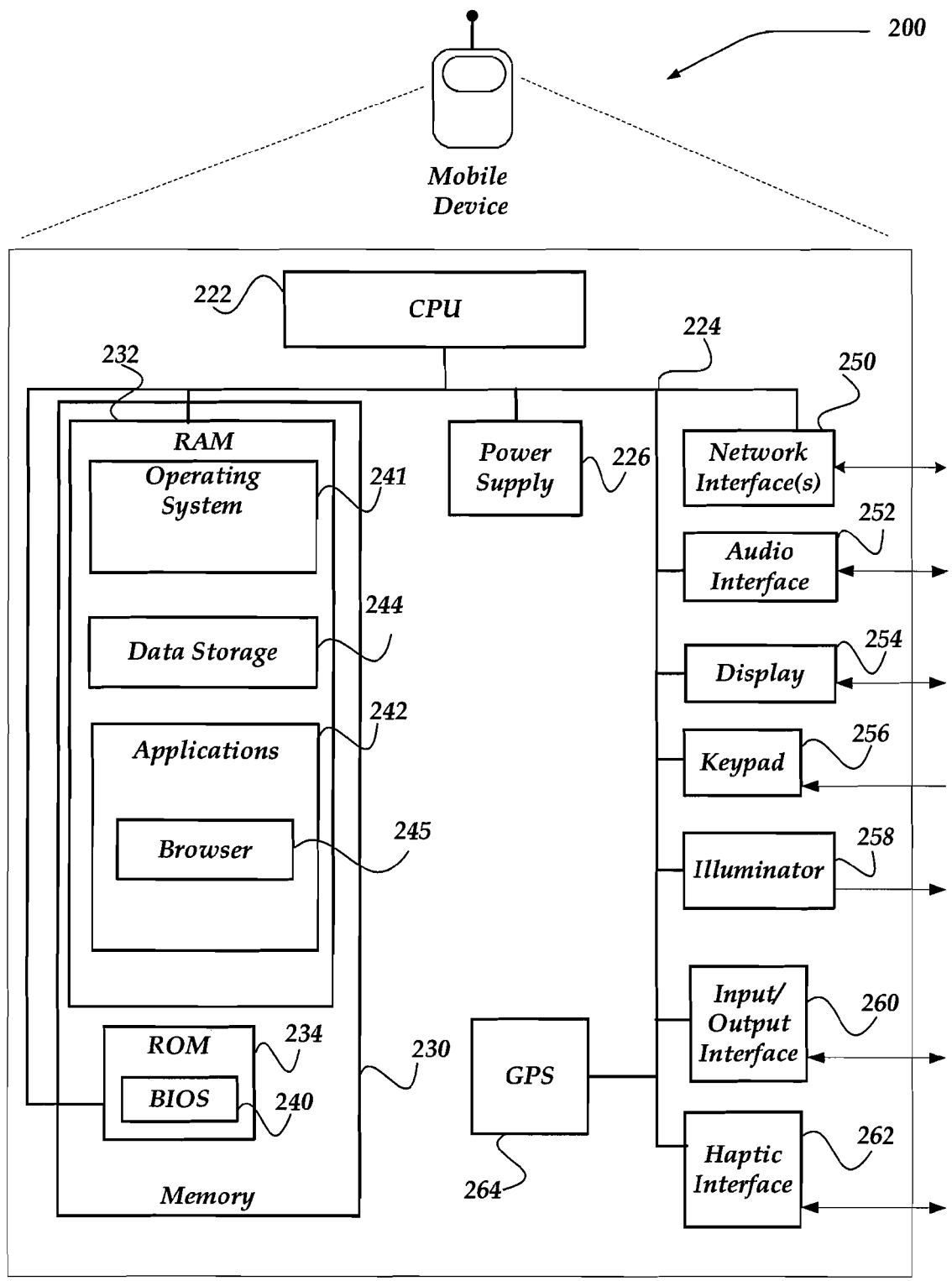
FIG. 2 illustrates a schematic diagram of one embodiment of an exemplary mobile device.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), Wide CDMA (CDMA), time division multiple access (TDMA), Universal Mobile Telephone Service (UMTS), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as processor readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a header during a communication, sent upon request, or the like.

Applications 242 may include computer executable instructions which, when executed by mobile device 200, transmit, receive, and/or otherwise process messages (e.g., SMS, MMS, IM, email, and/or other messages), audio, video, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, video games, gaming programs, search programs, shopping cart programs, and so forth. Applications 242 may further include browser 245. The browser application may be configured to receive and display graphics, text, multimedia, and the like, employing virtually any web based language, including a wireless application protocol messages (WAP), and the like. In one embodiment, the browser application for the mobile device is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display content and communicate messages.

Browser 245 may be configured to receive and enable a display of rendered content provided by platform 112. Further, browser 245 enables the user of mobile device 200 to select different actions displayed by the rendered content. In at least one embodiment, browser 245 enables the user to select one or more of a product to purchase, search for content and display the result, call another telephonic device, display and respond to messages, or the like.

Illustrative Network Device

FIG. 3 shows one embodiment of a network device, according to one embodiment of the invention. Network device 300 may include many more or less components than those shown. The components shown, however, are sufficient to disclose an illustrative embodiment for practicing the invention. Network device 300 may represent, for example, third party server 106, website server 107, recovery assist server 108, and/or client device 101 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, cd-rom/dvd-rom drive 326, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC). Network device 300 also comprises input/output interface 324 for communicating with external devices, such as a mouse, keyboard, headset, or other input or output devices not shown in FIG. 3. Input/output interface 324 can utilize one or more communication technologies, such as USB, infrared, Bluetooth™, or the like.

The mass memory as described above illustrates another type of processor-readable storage media. Processor readable storage media may include volatile, nonvolatile, removable, and non-removable media implemented in any method or technology for storage of information, such as processor readable instructions, data structures, program modules, code, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed and read by a processor for a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth. Recovery assist server 354, website server 356, and third party server 352 may also be included as an application program within applications 350. When recovery assist server 354, website server 356, or third party server 352 is executing on network device 300, the network device can represent recovery assist server 108, website server 107, and third party server 106 respectively. Also, recovery assist server 354, website server 356, and third party server 352 can be configured as a platform for enabling the performance of the present invention.

Illustrative User Interface

Figure 4A:
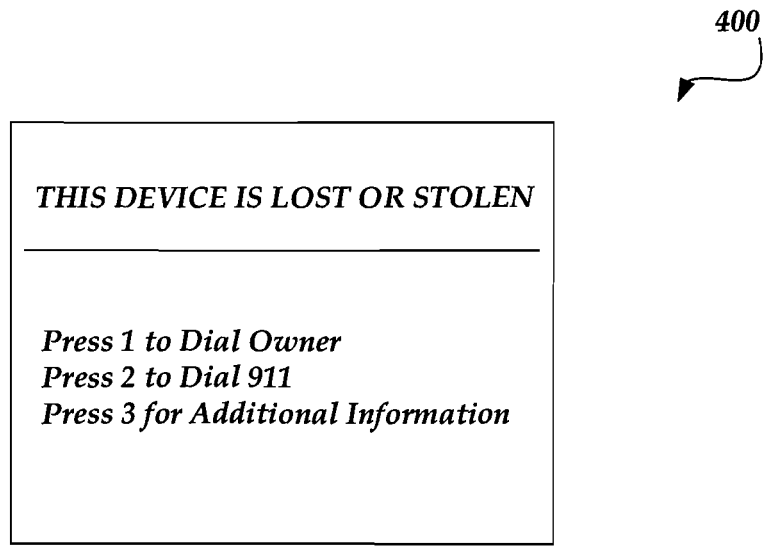
FIG. 4A illustrates an exemplary user interface of a mobile device for assisting a person in returning the device to an authorized user.

FIG. 4A illustrates an exemplary user interface 400 of a mobile device for assisting a person in returning the device to an authorized user. As shown, in one section of the user interface, a notice is provided indicating that the device is considered missing because the device is lost or stolen. In another section of the user interface, instructions are provided informing persons who discover the device that one of several speed dials can be pressed to contact the owner of the device, an emergency service, or another number to obtain additional information for returning the device.

Figure 4B:
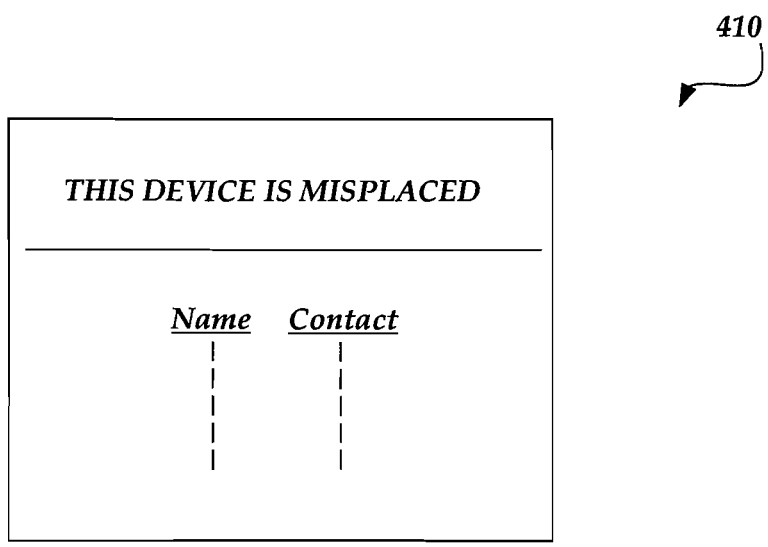
FIG. 4B illustrates another exemplary user interface of a mobile device for assisting a person in returning the device to an authorized user.

FIG. 4B illustrates an exemplary user interface 410 of a mobile device for assisting a person in returning the device to an authorized user. As shown, in one section of the user interface, a notice is provided indicating that the device is considered missing because the device has been misplaced. In another section of the user interface, a list of names and other contact information is provided to assist a person who discovers the device in returning the device.

Figure 4C:
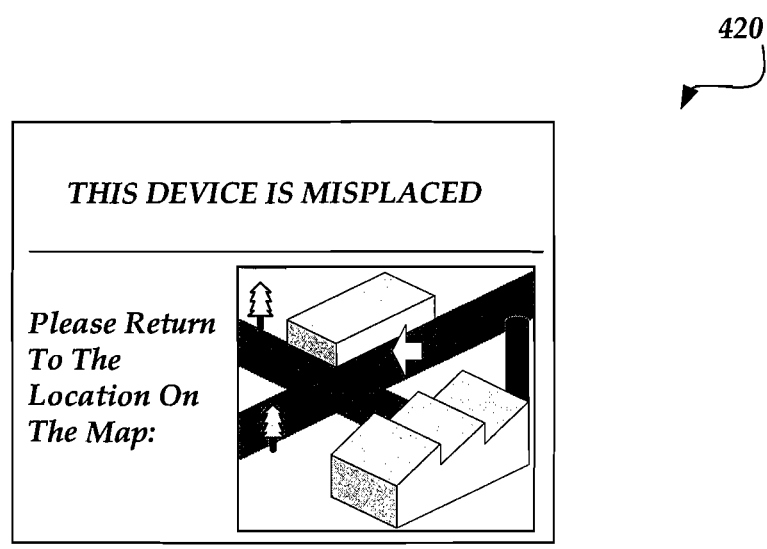
FIG. 4C illustrates yet another exemplary user interface of a mobile device for assisting a person in returning the device to an authorized user.

FIG. 4C illustrates an exemplary user interface 420 of a mobile device for assisting a person in returning the device to an authorized user. As shown, in one section of the user interface, a notice is provided indicating that the device is considered missing because the device has been misplaced. In another section of the user interface, a map is provided to inform a person of one or more locations for returning the device.

Illustrative Flow Charts

Figure 5A:
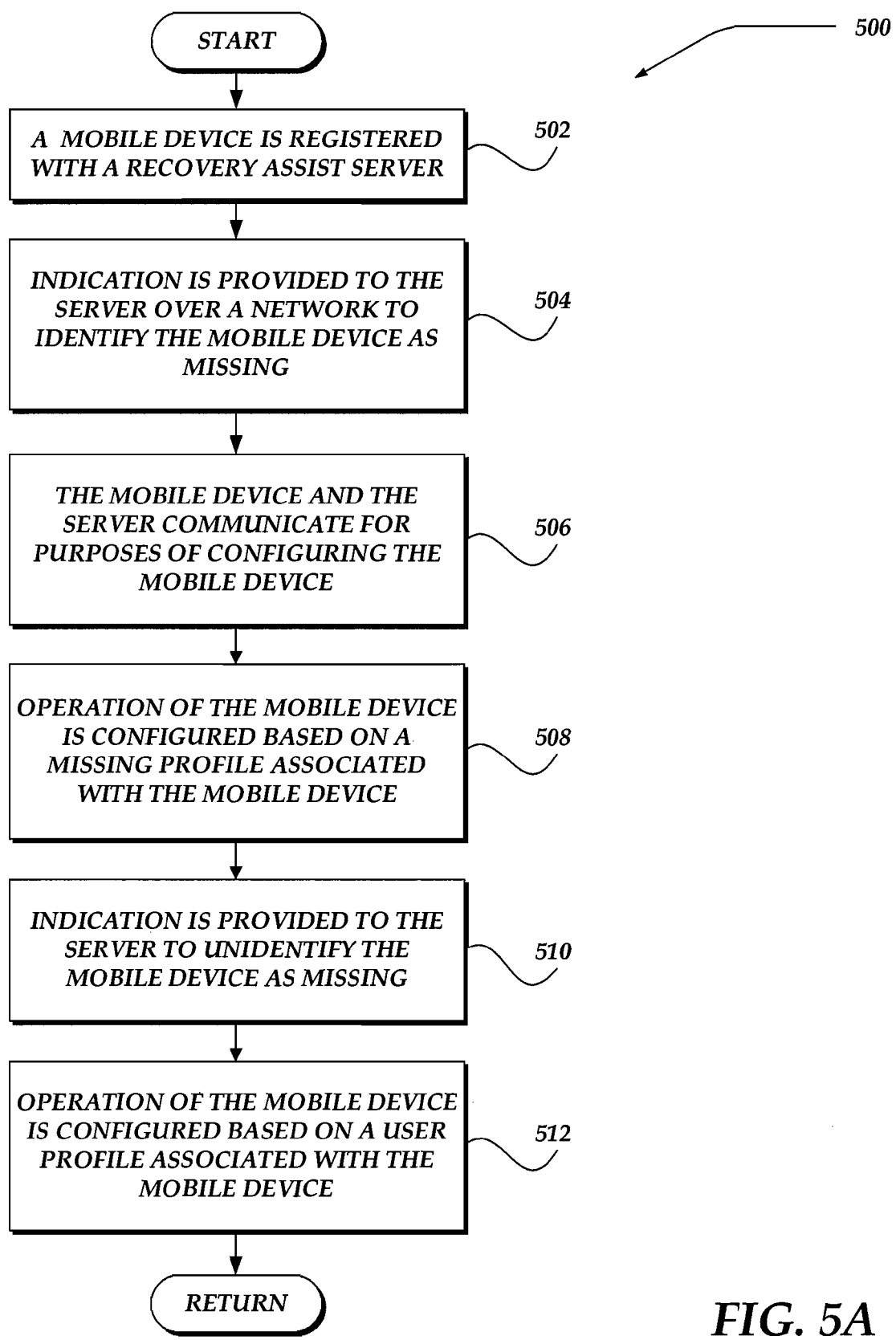
FIG. 5A is a flow chart of an exemplary process for a system for configuring a mobile device remotely to assist a person in returning the mobile device to an authorized user.

FIG. 5A is a flow chart for an exemplary process 500 for configuring a mobile device remotely to assist a person in returning the mobile device to an authorized user. Moving from a start block, the process steps to block 502 where a user registers a mobile device with a recovery assist server. In at least one or more embodiments, registration of the mobile device can require a creation of a user account with the server and/or associating the mobile device with a user account.

Advancing to block 504, an interface is provided to enable the user to indicate to the server over a network that the registered mobile device is missing. Also, in at least one or more embodiments, an interface is provided to the user to specify a missing profile for the mobile device.

Flowing to block 506, the mobile device and the server communicate over a network for purposes of configuring the mobile device. In at least one or more embodiments, the mobile device can initiate a communication with the server. Also, in at least one or more embodiments, the server can initiate a communication with the mobile device.

Next, advancing to block 508, if the mobile device is identified as missing on the server, the operation of the device is configured based on a missing profile. An exemplary process for configuring the device based on a missing profile is described below with reference to FIG. 5B. Further, in at least one or more embodiments, a current user profile of the mobile device is saved on the mobile device and/or the server.

Moving to block 510, an interface is provided to enable the user to indicate to the server over a network that the registered mobile device is no longer missing.

Advancing to block 512, if the mobile device is unidentified as missing on the server, the operation of the device is configured based on a user profile. Next, the process returns to performing other actions.

Figure 5B:
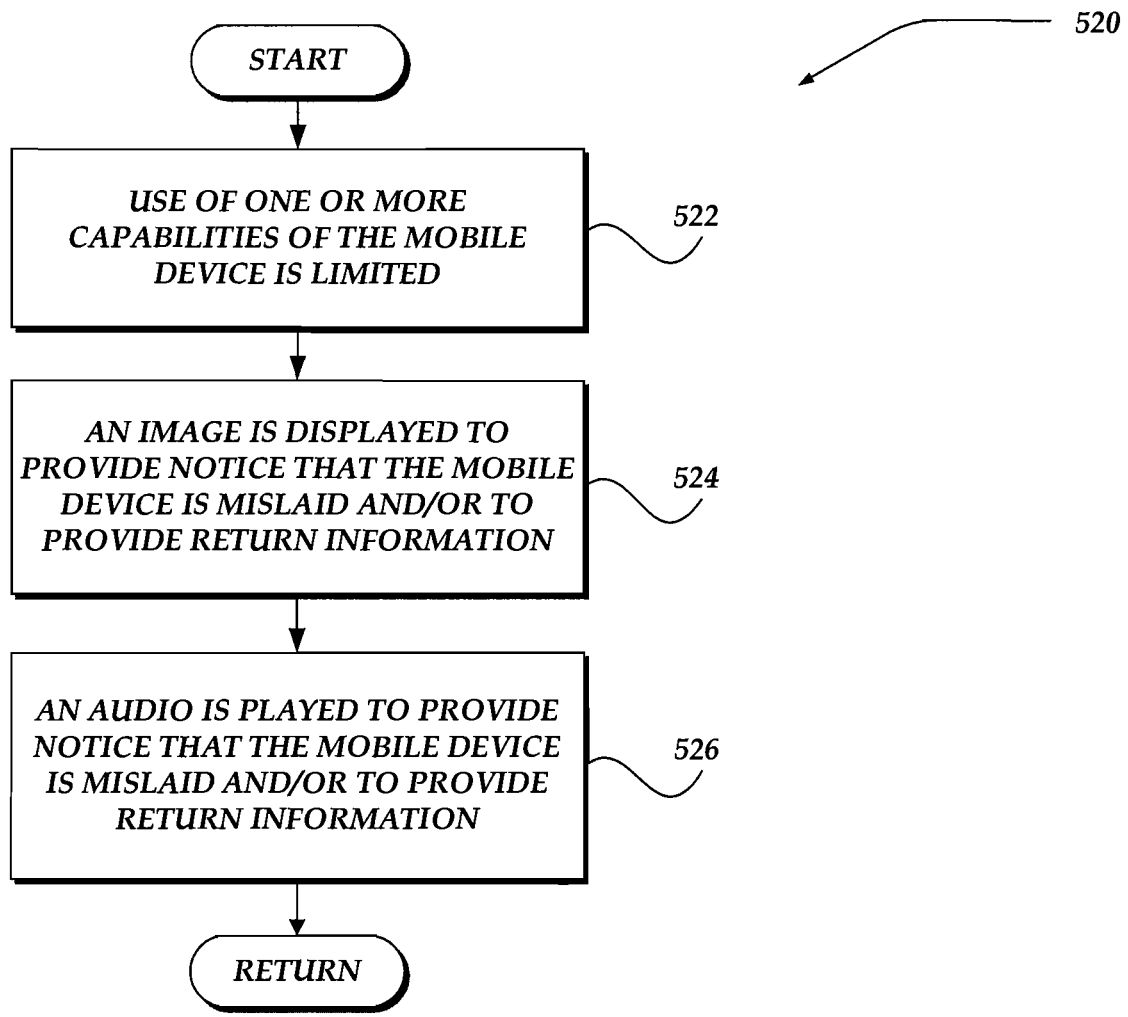
FIG. 5B is a flow chart of an exemplary process for configuring a mobile device to assist a person in returning the mobile device to an authorized user.

FIG. 5B is a flow chart of an exemplary process 520 for configuring a mobile device to assist a person in returning the mobile device to an authorized user. Moving from a start block, the process steps to block 522 in which the use of one or more capabilities of the mobile device is limited. For example, access to photos on the mobile device can be restricted to require a password to protect the privacy of the user.

Advancing to block 524, an image is displayed on a display of the mobile device to provide notification that the device is considered mislaid and/or to provide return information to assist others in returning the mobile device to the user.

Moving to block 526, an audio is played on a speaker of the mobile device to provide an audible notification that the device is considered mislaid and/or to provide return information for assisting others in returning the mobile device to the user. Next, the process returns to performing other actions.

Figure 5C:
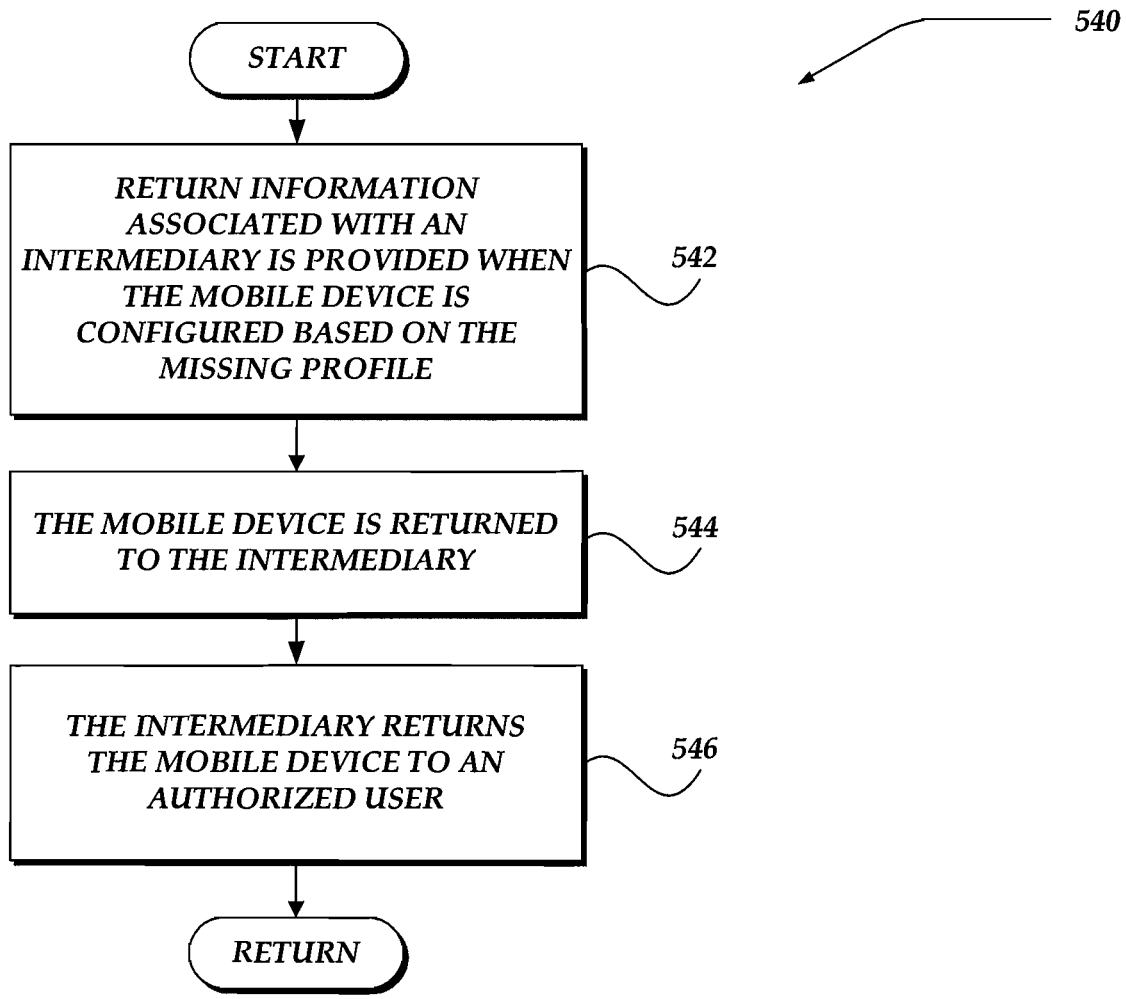
FIG. 5C is a flow chart of an exemplary process for a system for assisting a person in returning a mobile device to an authorized user through an intermediary.

FIG. 5C is a flow chart for an exemplary process 540 for a system for assisting a person in returning a mobile device to an authorized user through an intermediary. Moving from a start block, the process steps to block 542 where return information associated with an intermediary is provided when the operation of the mobile device is configured based on a missing profile. An intermediary can be any entity other than the user.

Flowing to block 544, utilizing the return information, the mobile device is provided to the intermediary by a person who discovers the mobile device.

Advancing to block 546, the intermediary forwards the mobile device to the user. Accordingly, process 540 enables the user to recover a mislaid mobile device without revealing any personal information to those persons who return the device. Next, the process returns to performing other actions.

It will be understood that each block of the above flowchart illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions executing on the processor provide steps for implementing the actions listed in the flowcharts discussed above.

Accordingly, blocks of the flowchart illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose

What is claimed as new and desired to be protected by Letters Patent of the United States is:

1. A mobile device comprising:
a transceiver;
a processor;
a non-transitory computer-readable storage medium for tangibly storing thereon program logic for execution by the processor, the program logic comprising:
registration logic executed by the processor for registering the mobile device with a server via the transceiver, said registration comprising configuring operation of the mobile device based on at least one of a user profile and a missing profile associated with the registered mobile device;
determination logic executed by the processor for determining whether the registered mobile device is identified by the server;
configuration logic executed by the processor for configuring the operation of the registered mobile device based on the missing profile when the registered mobile device is identified as missing on the server, said configuration comprising saving a current user profile, wherein the missing profile is configured to execute a program that displays return information, the return information being associated with an intermediary for receiving the missed registered mobile device and returning the missed registered mobile device to a user, where personal information about the user of the missed registered mobile device is not provided to the intermediary; and
restoration logic executed by the processor for restoring configuration of the operation of the registered mobile device based on the saved current user profile when the registered mobile device is unidentified as missing on the server.

2. The mobile device of claim 1, further comprising:
communication logic executed by the processor for communicating over a network to the server an indication of whether the registered mobile device is identified or unidentified as missing.

3. The mobile device of claim 1, wherein the missing profile specifies that the registered mobile device is to be configured to display an image which includes at least one of a notice that the registered mobile device is mislaid or return information.

4. The mobile device of claim 3, wherein the image includes at least one of: a background image, a screen saver, or a startup image.

5. The mobile device of claim 1, wherein the missing profile specifies that the registered mobile device is to be configured to play an audio which includes at least one of a notice that the registered mobile device is mislaid or return information.

6. The mobile device of claim 5, wherein the audio includes at least one of: a ring tone, a startup sound, or background music.

7. The mobile device of claim 1, wherein the missing profile specifies that the registered mobile device is to be configured to limit the use of one or more capabilities of the registered mobile device.

8. The mobile device of claim 7, wherein the registered mobile device includes voice communication capabilities and wherein use of the voice communication capabilities is limited to contacting a member of a select group, wherein the select group includes at least one of an authorized user, an emergency service, or an entity associated with the server.

9. A non-transitory processor-readable storage medium tangibly encoded with processor-executable instructions stored therein, which when executed by one or more processors, performs a method comprising:
registering a mobile device with a server, said registration comprising configuring operation of the mobile device based on at least one of a user profile and a missing profile that corresponds to the registered mobile device;
determining whether the registered mobile device is identified by the server;
configuring the operation of the registered mobile device based on the missing profile when the registered mobile device is identified as missing on the server, said configuration comprising saving a current user profile, wherein the missing profile is configured to execute a program that displays return information, the return information being associated with an intermediary for receiving the missed registered mobile device and returning the missed registered mobile device to a user of said missed registered mobile device, where personal information about the user is not provided to the intermediary; and
restoring configuration of the operation of the registered mobile device based on the saved current user profile when the registered mobile device is unidentified as missing on the server.

10. The non-transitory processor-readable storage medium of claim 9, wherein the missing profile specifies that the registered mobile device is to be configured to display an image which includes at least one of a notice that the registered mobile device is mislaid or return information.

11. The non-transitory processor-readable storage medium of claim 9, wherein the missing profile provides that the registered mobile device is to be configured to play an audio which includes at least one of a notice that the registered mobile device is mislaid or return information.

12. The non-transitory processor-readable storage medium of claim 9, wherein at least one of the processor executable instructions is downloaded.

13. A method comprising:
registering, over a network, a mobile device with a server, said registration comprising configuration operation of the mobile device based on at least one of a user profile and a missing profile that corresponds to the registered mobile device;
determining whether the registered mobile device is identified by the server;
configuring the operation of the registered mobile device based on the missing profile when the registered mobile device is identified as missing on the server, said configuration comprising saving a current user profile, wherein the missing profile is configured to execute a program that displays return information, the return information being associated with an intermediary for receiving the missed registered mobile device and returning the missed registered mobile device to a user of said missed registered mobile device, where personal information about the user is not provided to the intermediary; and restoring configuration of the operation of the registered mobile device based on the saved current user profile when the registered mobile device is unidentified as missing.

14. The method of claim 13, wherein the missing profile specifies that the registered mobile device is to be configured to indicate at least one of a notice that the registered mobile device is mislaid or return information.

15. The method of claim 14, wherein the return information includes contact information for the intermediary, wherein the intermediary upon receiving the registered mobile device forwards the registered mobile device to the user.

* * * * *